United States Patent [19]

Cambridge et al.

[11] 4,041,255
[45] Aug. 9, 1977

[54] SWITCHING CIRCUIT FOR TELECOMMUNICATIONS LINES

[75] Inventors: Ronan Malcolm Cambridge; Douglas John Watson, both of Ottawa, Canada

[73] Assignee: Northern Telecom Limited, Montreal, Canada

[21] Appl. No.: 727,709

[22] Filed: Sept. 29, 1976

[51] Int. Cl.² ............................................. H04B 3/46
[52] U.S. Cl. ......................................... 179/175.3 R
[58] Field of Search ............... 179/175.3 R, 175.31 R, 179/2 A, 18 FA, 81 R; 324/52, 95; 340/172; 317/16, 31; 328/111; 307/234

[56] References Cited

U.S. PATENT DOCUMENTS

| | | | |
|---|---|---|---|
| 3,636,280 | 1/1972 | Wetzel | 179/175.3 R |
| 3,725,613 | 4/1973 | Allen et al. | 179/175.3 R |
| 3,739,107 | 6/1973 | Spencer | 179/175.3 R |
| 3,766,336 | 10/1973 | Wikholm | 179/175.3 R |
| 3,773,986 | 11/1973 | Tremblay | 179/175.3 R |
| 3,867,588 | 2/1975 | Pickens | 179/175.3 R |
| 3,919,487 | 11/1975 | Gabrielson | 179/175.3 R |

Primary Examiner—Thomas A. Robinson
Attorney, Agent, or Firm—Frank Turpin

[57] ABSTRACT

A switching circuit includes a magnetically latching relay and associated contacts connected between a subscriber loop and associated subscriber equipment. In one state of latched operation the subscriber equipment is connected to the loop via the contacts and in the other state of latched operation the subscriber equipment is disconnected from the loop. To operate the relay a voltage is applied to the loop, the voltage being of sufficient value to charge a capacitor in the switching circuit to the threshold voltage of a PNPN diode which is connected in series with the operate coil in the latching relay. The PNPN diode discharges the capacitor through the operate coil to cause the relay to latch magnetically in a make or break state depending upon the polarity of the discharge current. An AC resonantly responsive relay is added to the switching circuit to selectively inhibit switching circuit response in the case where more than one switching circuit is utilized on a loop. Hence different subscriber equipments can be selectively connected or disconnected as required.

10 Claims, 3 Drawing Figures

SWITCHING CIRCUIT FOR TELECOMMUNICATIONS LINES

The present invention relates to remote supervision of attachments to telephone lines and more particularly to switching circuits for disconnecting and connecting subscriber equipment associated with a subscriber loop.

Operating telephone companies often experience situations where it would be advantageous to remotely disconnect subscriber equipment on a temporary or semi-permanent basis. One situation arises, for example when a subscriber wishes to have his service terminated. In this case a disconnect is usually effected at the related switching facility. However, if the subscriber is on a party line it would be advantageous for the operating company to be able to remotely disconnect the subscriber equipment from the loop and to reconnect it again at a latter date as required without disturbing the other party on the subscriber loop and without involving field personnel.

Another example situation arises when the subscriber loop or telephone line requires testing, without interference from the subscriber equipment, to determine serviceability of the subscriber loop. Typically, this requires that field personnel journey to the subscriber's premises and disconnect the subscriber equipment. At one time this was of little or no consequence as the operating company almost always owned the subscriber equipment in addition to the subscriber loop and was responsible for the repair of both. At present however, it is commonplace, in some areas, for a subscriber to own the terminal equipment and to lease access to the telephone network. In the event of a malfunction it is economically attractive for the telephone company to be able to determine the serviceability of the subscriber loop without interference from the customer owned equipment and without the expense of field personnel becoming involved. Of course, if the subscriber loop is found to be faulty field personnel may be required for its repair, but if the subscriber loop is in good order, the operating telephone company is spared this expense as the malfunction is in the customer owned equipment and therefore is the customer's responsibility.

In the established routines for testing subscriber loops it is advantageous to have the loop free of any voltage and or signals other than those required for evaluating the subscriber loop. To be otherwise only tends to lead toward confusing and less accurate results. This is recognized in various publications, for example in U.S. Pat. No. 3,725,613 issued on Apr. 3, 1973 R.W. Allen et al, and U.S. Pat. No. 3,867,588 issued on Feb. 18, 1975 to H.L. Pickens et al. Both Allen and Pickens disclose circuits for disconnecting subscriber apparatus and later reconnecting the subscriber apparatus. Both disclosures teach a threshold circuit which charges a capacitor or battery when a high voltage signal is applied to the subscriber loop. Both these storage mediums are required to hold a charge substantial enough to maintain a relay in an operated condition, after the high voltage signal is removed for a period of time long enough to perform a subscriber loop test. Allen et al teaches a capacitor which for economy would be of the electrolytic type but which limits operational application to essentially above-freezing environments. Pickens et al teaches a battery which by its very mode of described operation essentially is of the nickel-cadmium type. Battery storage is relatively expensive, and its use in this application is somewhat limited to the more moderate temperature environments.

The present invention provides a switching circuit for disconnecting and reconnecting a subscriber equipment associated with a subscriber loop. A voltage signal of higher potential than that normally found on the typical subscriber loop circuit is applied to the loop circuit. The switching circuit responds to the voltage signal by effecting a state of connection or disconnection between the subscriber equipment and the subscriber loop. After a disconnect state is effected the subscriber loop is available for testing by well known procedures, without interference from subscriber equipment or any requirement for any signals to maintain the disconnect state. The switching circuit includes circuit elements well adapted to working over a wide temperature range and is thus serviceable in practically all outdoor environments.

The present invention is a switching circuit including a magnetically latching relay and associated contact means for connection between a subscriber loop and associated subscriber equipment, and a variable impedance means connected in series with the latching relay. The variable impedance means is characterized by high and lower impedance states and switches from the high to the lower impedance state in response to a predetermined voltage and switches from the lower to the high impedance state in response to a current flow therethrough being reduced beyond a minimum current flow. A charge storage means, for connection to the subscriber loop, accumulates a charge in response to voltage present on the loop circuit. The charge storage means is connected to the variable impedance means and when the accumulated charge reaches the potential value of the predetermined voltage, the accumulated charge is rapidly dissipated through the variable impedance means and the latching relay. This causes the associated contacts to effect a connected state or a disconnected state, depending upon the polarity of the charge. Another feature is that of a relay circuit which is responsive to a control signal on the subscriber loop. The relay circuit includes a contact connected across the charge storage means whereby the charge storage means may be rendered inoperative by closure of the contact. One or more switching circuits connected with a subscriber loop or thereby selectively operable to disconnect or reconnect one or more subscriber equipments.

An example embodiment of the invention will now be described with reference to the accompanying drawings in which.

Figure 1:
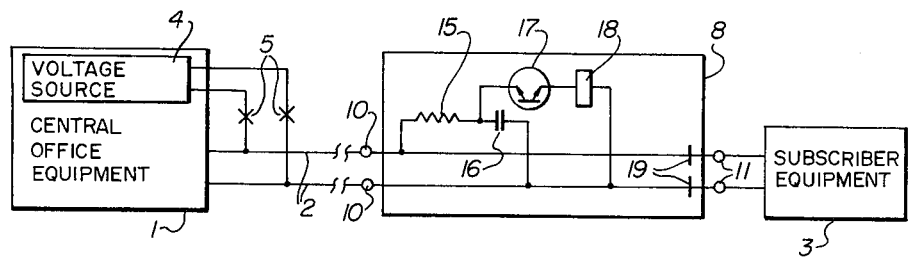
FIG. 1 is a block schematic diagram of a system including a switching circuit for disconnecting and reconnecting subscriber equipment associated with a subscriber loop.

Referring to FIG. 1, central office equipment 1 and a subscriber equipment 3 are interconnected via a subscriber loop 2 and a switching circuit 8. A voltage source 4 associated with the central office equipment 1 is connectable with the subscriber loop 2 via make contacts 5. The switching circuit 8 is connected in series between the subscriber loop 2 and the subscriber equipment 3 by subscriber loop terminals 10 connected to the subscriber loop 2, and by subscriber equipment terminals 11 connected to the subscriber equipment 3. The switching circuit 8 includes a resistor 15 and a capacitor 16 connected in series across the subscriber loop terminals 10. A PNPN diode 17 sometimes referred to as a Diac* and a magnetically latching relay 18 are connected in series across the capacitor 16. The relay 18 includes a pair of break contacts 19. One of the break contacts 19 is connected between one pair of the terminals 10 and 11 and the other of the break contacts 19 is connected between the other pair of the terminals 10 and 11.

* Trademark

In operation, the contacts 19 of the relay 18 are normally closed to interconnect the subscriber equipment 3 and the central office equipment 1. When it is required that the subscriber equipment 3 be disconnected, a high voltage is applied from the voltage source 4 across the loop to activate the switching circuit 8. A convenient voltage source usually present in a central office is a 130 volt DC source which is used in conjunction with coin telephone supervision. The high voltage causes the capacitor 16 to accumulate a charge, through the resistor 15. The capacitor 16 accumulates charge until the voltage across the capacitor reaches the breakdown voltage of the Diac 17. The Diac 17 then switches from a high impedance state to a lower impedance state to conduct a current through the coil of the relay 18. A very small portion of the current conducted through the relay 18 flows directly from the subscriber loop via the resistor 15. However this current is insignificant as compared to the bulk of the current which is obtained from discharging of the capacitor 16. When the current through the Diac 17 falls below a minimum current, the Diac 17 switches back to its high impedance state. This minimum current is greater than that conducted by the resistor 15 in the presence of the high voltage. The above-described function will continue repeatedly as long as the high voltage is applied across the subscriber loop; however, the high voltage only need be applied for a period of time long enough to cause one charge/discharge cycle of the capacitor 16. The polarity of the high voltage determines whether the contacts 19 are latched open or are latched closed. The magnetically latching relay 18 includes a permanent magnet in its structure which produces a magnetic field of sufficient intensity to maintain the contacts 19 closed in the event they are already closed. Coil current in the relay 18 thus momentarily reinforces the magnetic field of the permanent magnet to close the contacts 19 in the event of a sufficient current pulse through the coil in one direction, and momentarily cancels the magnetic field of the permanent magnet to open the contacts 19 in the event of a sufficient current pulse in the opposite direction.

Figure 2:
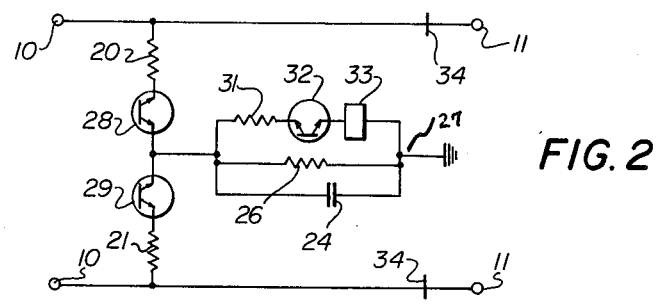
FIG. 2 is a schematic diagram of an alternate switching circuit suitable for use in FIG. 1.

The circuit in FIG. 2 can be used as a direct replacement for the switching circuit 8 in FIG. 1 and includes the terminals 10 and 11. However, in FIG. 2 there is an additional connection, that of a ground terminal 27. The ground terminal 27 need only be connected to earth, as impedances of up to a few thousands of ohms have little effect upon circuit operation. This circuit carries an advantage over the circuit 8 in FIG. 1 in that it can be operated from either side of the loop and hence remains operational in spite of various faults which may impair operation of the subscriber loop or the subscriber equipment. The circuit in FIG. 2 includes a series connection of a resistor 20, a Diac 28, a Diac 29 and a resistor 21, the whole being connected between the subscriber loop terminals 10. A charge storage circuit, consisting of a resistor 26 in parallel with a capacitor 24, is connected between the ground terminal 27 and the junction between the Diacs 28 and 29. A magnetically latching relay 33, including two break contacts 34, is connected to the ground terminal 27 and in series with a Diac 32 which is connected through a resistor 31 to the junction between the Diacs 28 and 29. The break contacts 34 are each connected between one of the subscriber loop terminals 10 and one of the subscriber equipment terminals 11.

The operation of the circuit in FIG. 2 is similar to the circuit 8 in FIG. 1 except that the high voltage need only be applied to either side of the loop and not across the loop. When the high voltage is applied to one of the loop terminals 10, one of the Diacs 28 or 29 conducts via the capacitor 24 and the ground terminal 27 until the capacitor 24 is charged to a potential sufficient to cause the Diac 32 to conduct. The charge stored in the capacitor 24 is then conducted through the resistor 31, the Diac 32 and the magnetically latching relay 33. The resistor 31 limits the peak current and prolongs the duration of the discharge so that the discharge current is of preferred magnitude and duration to latch or unlatch the relay contacts 34, depending upon the polarity of the high voltage applied.

Figure 3:
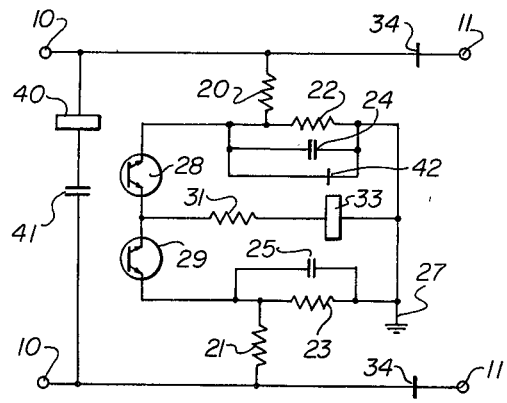
FIG. 3 is a schematic diagram of an alternate switching circuit suitable for use in FIG. 1.

The circuit in FIG. 3 can also be used to replace the circuit 8 in FIG. 1 and is an alternate embodiment to the circuit in FIG. 2. It has an additional feature in that it is remotely controllable to be selectively non-responsive to the high voltage being applied to one side of the loop while remaining responsive to the high voltage when applied to the other side of the loop.

In the following description of FIG. 3, circuit elements similar to the circuit elements in FIG. 2 are similarly identified. Resistors 20 and 21 and Diacs 28 and 29 are series connected across the subscriber loop terminals 10, similar to FIG. 2. The latching relay 33 and the resistor 31 are connected in series between the ground terminal 27 and the junction between the Diacs 28 and 29. However the Diac 32 (FIG. 2) is not used in this circuit. A capacitor 25 and a resistor 23 connected in parallel provide a charge storage circuit connected between the ground terminal 27 and the junction between the resistor 21 and the Diac 29. Another charge storage circuit is provided by the capacitor 24 and a resistor 22 connected in parallel between the ground terminal 27 and the junction between the resistor 20 and the Diac 28. The two break contacts 34 are each connected between the subscriber loop terminals 10 and the subscriber equipment terminals 11. A resonant relay 40 is connected in series with a capacitor 41 between the subscriber loop terminals 10. A relay contact 42 associated with the resonant relay 40 is connected between the ground terminal 27 and the junction between the resistor 20 and the Diac 28.

The operation of the circuit in FIG. 3 is quite similar to the operation of the circuit in FIG. 2 except that in FIG. 3 one or the other of the capacitors 24 and 25 is charged with the application of high voltage to one or the other leads in the subscriber loop. If the capacitor 25 is charged to the breakdown voltage of the Diac 29, discharge occurs through the Diac 29, the resistor 31 and the relay 33. If it is the capacitor 24 which is charged and discharged, the discharge path is by via the Diac 28, the resistor 31 and the relay 33. As described before, the polarity of the high voltage applied determines the direction of the discharge and hence the state of the break contacts 34.

When more than one subscriber is serviced by the subscriber loop the circuit in FIG. 3 is associated with one subscriber and made non-responsive to high voltage applied to one side of the loop. Another circuit similar to that in FIG. 3 may be associated with the other subscriber. If so, this circuit is made non-responsive to high voltage applied to the other side of the loop. The relay 40, in combination with the capacitor 41 forms a resonant circuit. Different values of the capacitor 41 will yield different resonant frequencies at which the relay can be operated. Operation of the relay causes both the charge storage circuits to be available for operation of the switching circuit. In practice, one or the other of the switching circuits is operated by applying the high voltage to one or the other sides of the loops. Hence one or the other of the associated subscriber equipments is selectively disconnected from the subscriber loop. In the case where a fault causes a ground to appear on one of the leads of the subscriber loop, the simultaneous application of the high voltage to both sides of the loop and the resonant frequency across the loop causes the break contact 42 in both switching circuits to operate. Thus both switching circuits become responsive to high voltage on either of the leads of the loop.

Typical component values for the resistors 20 and 21 is between 300 and 400 Kohms and are collectively of such high impedance as to have little or no effect upon testing of the loop. This high impedance also minimizes the possibility of false response by the switching circuit to itinerate high voltage impulses which may from time to time appear on the subscriber loop but are typically of short duration. Furthermore, the capacitor 24 and 25 is of low capacitance and can be economically provided as a paper capacitor or the like. It is well known that capacitors of this type operate satisfactorily over wide temperature ranges and hence any of the embodiments described are well adapted to installation in both indoor and outdoor environments. Although each of the embodiments described in conjunction with the figures employs one or more Diacs as high/low impedance devices, this function can be provided by alternate means, for example a gas tube.

The installation and use of switching circuits as or similar to those described above provides a remote disconnect capability. Once the subscriber equipment is disconnected, normal loop testing procedures are carried on to verify the serviceability of the subscriber loop, without interference from the subscriber equipment. For example, some typical test procedures and equipment are described in A.T. & T. Bell Systems Practice, Sections 602-400-101 and 501 issued during November 1966. Only in the cases where the loop is found to be faulty or operating company owned subscriber equipment appears to be faulty are the services of a telephone company repair man required. In areas of the telephone network where there is a substantial number of subscribers who own the subscriber equipment or in areas where there is a substantial demand for periodic service restrictions, usage of these switching circuits will accrue substantial operating economies.

What is claimed is:

1. A switching circuit for connecting and disconnecting subscriber equipment associated with a subscriber loop, in response to a voltage control signal momentarily transmitted on the subscriber loop, the switching circuit comprising:

switch means including a magnetically latching relay and associated contact means, the contact means for connection in series between the subscriber loop and subscriber equipment, whereby operation of the latching relay effects a connected state or a disconnected state between the subscriber equipment and the subscriber loop via the contact means;

a variable impedance means connected in series with the latching relay, the variable impedance means having high and lower impedance states and being responsive to a predetermined voltage to switch from the high to the lower impedance state and being responsive to the current flow therethrough being reduced below a predetermined level to switch to the high impedance state;

switch control means connected to the switch means, the switch control means including charge storage means for connection via a predetermined impedance means to a lead in the subscriber loop, whereby the voltage control signal causes an accumulation of charge to occur in the charge storage means at a potential of up to said predetermined voltage whereafter the accumulated charge is rapidly dissipated through the variable impedance means and the latching relay causes the associated contacts to effect one of the two states.

2. A switching circuit as defined in claim 1 in which the charge storage means and the impedance comprise a resistive capacitive network including a resistive portion for connection to a lead in the subscriber loop and a capacitive portion connected to the switch means, the resistive portion being of such value that in the present of the voltage control signal, on said lead, said charge slowly accumulates in the capacitive portion until said predetermined voltage is reached, and in the absence of the voltage control signal other signals on the subscriber loop are of insufficient voltage and duration to cause said predetermined voltage to be reached.

3. The switching circuit as defined in claim 2 in which the capacitive portion comprises a capacitor and a resistor connected in parallel, and the capactive portion is connected across the series connection of the variable impedance means and the magnetically latching relay.

4. A switching circuit as defined in claim 2 in which first and second switch control means are connected in series for connection across the subscriber loop and in which the switch means includes first and second variable impedance means, the first variable impedance means being connected to the junction between the resistive and capacitive portions in the first switch control means, and the second variable impedance means being connected to the junction between the resistive and capacitive portion in the second switch control means whereby the magnetically latching relay is actuatable from either side of the subscriber loop.

5. A switching circuit as defined in claim 4 further comprising means for inhibiting response in one of said switch control means, in response to an inhibit signal from the associated switching facility, the inhibiting means for connection across the subscriber loop on the side of the contact means adjacent the switching facility, and including switch means connected across the capacitive portion in said one switch control circuit, whereby the state of connection of one of two subscriber equipments, each associated with the subscriber loop via contact means in first and second switching circuits respectively, is alterable without disturbing the state of connection of the other of the two subscriber equipments.

6. A switching circuit as defined in claim 2, further comprising loop terminals for connection to the subscriber loop, subscriber terminals for connection to the subscriber equipment and a reference terminal for connection to earth, and in which said contact means is connected between the loop terminals and the subscriber terminals, the capacitive portion is connected across the series connection of the variable impedance means and the magnetically latching relay, the magnetically latching relay is terminated at the reference terminal, and the resistive portion is connected to one of the loop terminals.

7. A switching circuit as defined in claim 4, further comprising loop terminals for connection to the subscriber loop, subscriber terminals for connection to the subscriber equipment and a reference terminal for connection to earth, and in which the resistive portions of the first and second switch control means are connected each to a separate one of the loop terminals, and the magnetically latching relay is terminated at the reference terminal.

8. A switching circuit for connecting and disconnecting subscriber equipment associated with a subscriber loop in response to a control signal momentarily transmitted on one of two leads of the subscriber loop, the switching circuit comprising:
   first and second loop terminals for connection to the leads of the subscriber loop, first and second subscriber terminals for connection to the subscriber equipment and a reference terminal for connection to earth;
   a magnetically latching relay having an operate coil and associated contact means, one end of the operate coil being connected to the reference terminal, the contact means being connected in series between the loop terminals and the subscriber terminals whereby the magnetically latching relay effects a state of connection or disconnection between the subscriber loop and the subscriber terminals;
   first and second variable impedance means each having high and lower impedance states and each being responsive to a predetermined voltage to switch from the high to the lower impedance state to conduct current therethrough;
   first and second charge storage means connected between the reference terminal and the first and second loop terminals respectively, the first and second charge storage means each having a discharge terminal, said first and second variable impedance means being connected in series between the other end of said operate coil and the discharge terminals of the first and second charge storage means respectively, whereby said predetermined voltage appearing at the discharge terminal of one of the charge storage means causes the associated variable impedance means to conduct and thereby discharge the one charge storage means through the operate coil to the ground terminal.

9. A switching circuit as defined in claim 8 further comprising an inhibit relay means, and associated inhibit contact means, the inhibit relay means being connected between the loop terminals and the inhibit contact means connected in series between one of said discharge terminals and the ground terminal, the inhibit relay means being responsive to a predetermined signal appearing across the loop terminal to control operation of the inhibit contact means and thereby render said one charge storage means selectively operative or inoperative, whereby one of a plurality of the switching circuits associated with a single subscriber loop is selectably operative by the control signal.

10. A switching circuit as defined in claim 9 in which the predetermined signal is an alternating current signal of a predetermined frequency and in which the inhibit relay means includes an operate coil in a resonant circuit which is resonant at about said predetermined frequency.

* * * * *